(12) United States Patent
Yamazaki et al.

(10) Patent No.: US 7,425,378 B2
(45) Date of Patent: Sep. 16, 2008

(54) MAGNETIC RECORDING MEDIUM

(75) Inventors: Katsuhiko Yamazaki, Tokyo (JP); Tsutomu Ide, Tokyo (JP); Takashi Handa, Tokyo (JP); Akinori Nishizawa, Tokyo (JP)

(73) Assignee: TDK Corporation, Tokyo (JP)

( * ) Notice: Subject to any disclaimer, the term of this patent is extended or adjusted under 35 U.S.C. 154(b) by 440 days.

(21) Appl. No.: 10/898,232

(22) Filed: Jul. 26, 2004

(65) Prior Publication Data
US 2006/0019127 A1    Jan. 26, 2006

(51) Int. Cl.
*G11B 5/66* (2006.01)
(52) U.S. Cl. .................................... 428/840
(58) Field of Classification Search ........... 428/840.2, 428/840.1, 840
See application file for complete search history.

(56) References Cited

U.S. PATENT DOCUMENTS

2005/0158586 A1* 7/2005 Matsumoto et al. ... 428/694 BA

FOREIGN PATENT DOCUMENTS

| JP | 8-194935 | 7/1996 |
|---|---|---|
| JP | 2004-5931 | 1/2004 |

OTHER PUBLICATIONS

Machine translation of JP 2004-005931, Jan. 2004.*

* cited by examiner

*Primary Examiner*—Holly Rickman
(74) *Attorney, Agent, or Firm*—Oblon, Spivak, McClelland, Maier & Neustadt, P.C.

(57) ABSTRACT

The present invention provides a magnetic recording medium which has a thin film magnetic layer considerably excellent in surface smoothness, and is excellent in electromagnetic conversion property. A magnetic recording medium comprising a non-magnetic support, a lower non-magnetic layer comprising at least a non-magnetic powder and a binder resin on one surface of the non-magnetic support, and a magnetic layer comprising at least a ferromagnetic powder and a binder resin on the lower non-magnetic layer, wherein when the magnetic recording medium is subjected to extraction treatment with water, 7 to 23 μg of $PO_4^{3-}$ ions are extracted per 10 mm³ of the volume of the lower non-magnetic layer of the magnetic recording medium. A magnetic recording medium comprising a non-magnetic support, a lower non-magnetic layer comprising at least a non-magnetic powder and a binder resin on one surface of the non-magnetic support, and a magnetic layer comprising at least a ferromagnetic powder and a binder resin on the lower non-magnetic layer, wherein when the magnetic recording medium is subjected to extraction treatment with water, 8 to 22 μg of $Mg^{2+}$ ions are extracted per 10 mm³ of the volume of the lower non-magnetic layer of the magnetic recording medium.

14 Claims, No Drawings

MAGNETIC RECORDING MEDIUM

BACKGROUND OF THE INVENTION

1. Field of the Invention

The present invention relates to a magnetic recording medium, in particular, a magnetic recording tape excellent in surface smoothness and electromagnetic conversion property.

2. Disclosure of the Related Art

Conventionally, magnetic recording media have a magnetic layer on one surface of a non-magnetic support, and have a back coat layer on the other surface of the non-magnetic support in order to improve the running durability thereof and others.

In recent years, the recording density of magnetic recording tape has been desired to be made high in order to cope with an increase in the quantity of recording data. In order to make the recording density of the tape higher, the recording wavelength thereof has been made shorter and the magnetic layer has been made thinner.

In the case that the magnetic layer is made thin, the surface roughness of the support is reflected on the surface of the magnetic layer so that the smoothness of the magnetic layer surface is damaged. Consequently, the electromagnetic conversion property of the magnetic layer deteriorates. For this reason, for example, a non-magnetic layer is formed as an undercoat layer on the surface of the support, and then the magnetic layer is formed on this non-magnetic layer.

As the recording wavelength is made shorter, the magnetic layer surface is required to be made smoother from the viewpoint of spacing loss. For this purpose, the surface of the non-magnetic layer as an undercoat layer is also required to be smoother.

As a non-magnetic powder for forming the non-magnetic layer, acicular iron oxide powder is used. In many cases, sintering is caused in the acicular iron oxide powder. If the acicular iron oxide powder wherein sintering is caused is used, the surface of the non-magnetic layer does not become smooth.

Japanese Laid-Open Patent Publication No. 2004-5931 discloses a powder for a lower layer of a magnetic recording medium, which is made of acicular iron oxide particles having an average long axis length of 20 to 200 nm, which has a specific surface area of 30 to 100 $m^2/g$ according to the BET method and a powder pH of 7 or less and which comprises 0.1 to 5.0% by weight of P, in order to obtain a smooth non-magnetic layer surface.

Furthermore, Japanese Laid-Open Patent Publication No. 08-194935 (1996) discloses a magnetic recording medium comprising a magnetic layer which comprises a magnetic powder and a binder and is formed on a non-magnetic support, wherein the concentration of potassium ions eluted into water from any one gram from the magnetic layer is 100 ppm or less. This publication, paragraph [0014] states that the concentration of potassium ions eluted into water from "any one gram from the magnetic layer" means the following concentration when lower layers such as a non-magnetic layer and an undercoat layer are formed: the concentration of eluted potassium ions from any one gram of the combination of the lower layers such as the non-magnetic layer and the undercoat layer, and the magnetic layer.

SUMMARY OF THE INVENTION

An object of the present invention is to provide a magnetic recording medium which has a thin film magnetic layer considerably excellent in surface smoothness, and is excellent in electromagnetic conversion property.

The present invention includes the following aspects.

(1) A magnetic recording medium comprising:
a non-magnetic support,
a lower non-magnetic layer comprising at least a non-magnetic powder and a binder resin on one surface of the non-magnetic support, and
a magnetic layer comprising at least a ferromagnetic powder and a binder resin on the lower non-magnetic layer, wherein
when the magnetic recording medium is subjected to extraction treatment with water, 7 to 23 µg of $PO_4^{3-}$ ions are extracted per 10 $mm^3$ of the volume of the lower non-magnetic layer of the magnetic recording medium.

(2) The magnetic recording medium according to the above (1), wherein the lower non-magnetic layer comprises an acicular iron oxide powder as the non-magnetic powder.

(3) The magnetic recording medium according to the above (2), wherein the specific surface area of the acicular iron oxide powder as measured by the BET method is from 70 to 100 $m^2/g$.

(4) The magnetic recording medium according to the above (1), wherein the thickness of the lower non-magnetic layer is from 0.3 to 2.5 µm, and the thickness of the upper magnetic layer is from 0.03 to 0.30 µm.

(5) A magnetic recording medium comprising:
a non-magnetic support,
a lower non-magnetic layer comprising at least a non-magnetic powder and a binder resin on one surface of the non-magnetic support, and
a magnetic layer comprising at least a ferromagnetic powder and a binder resin on the lower non-magnetic layer, wherein
when the magnetic recording medium is subjected to extraction treatment with water, 8 to 22 µg of $Mg^{2+}$ ions are extracted per 10 $mm^3$ of the volume of the lower non-magnetic layer of the magnetic recording medium.

(6) The magnetic recording medium according to the above (5), wherein the lower non-magnetic layer comprises an acicular iron oxide powder as the non-magnetic powder.

(7) The magnetic recording medium according to the above (6), wherein the specific surface area of the acicular iron oxide powder as measured by the BET method is from 70 to 100 $m^2/g$.

(8) The magnetic recording medium according to the above (5), wherein the thickness of the lower non-magnetic layer is from 0.3 to 2.5 µm, and the thickness of the upper magnetic layer is from 0.03 to 0.30 µm.

(9) A magnetic recording medium comprising:
a non-magnetic support,
a lower non-magnetic layer comprising at least a non-magnetic powder and a binder resin on one surface of the non-magnetic support, and
a magnetic layer comprising at least a ferromagnetic powder and a binder resin on the lower non-magnetic layer, wherein
when the magnetic recording medium is subjected to extraction treatment with water, 7 to 23 µg of $PO_4^{3-}$ ions are extracted, and 8 to 22 µg of $Mg^{2+}$ ions are extracted, per 10 $mm^3$ of the volume of the lower non-magnetic layer of the magnetic recording medium.

(10) The magnetic recording medium according to the above (9), wherein the lower non-magnetic layer comprises an acicular iron oxide powder as the non-magnetic powder.

(11) The magnetic recording medium according to the above (10), wherein the specific surface area of the acicular iron oxide powder as measured by the BET method is from 70 to 100 m$^2$/g.

(12) The magnetic recording medium according to the above (9), wherein the thickness of the lower non-magnetic layer is from 0.3 to 2.5 μm, and the thickness of the upper magnetic layer is from 0.03 to 0.30 μm.

According to the present invention, provided is a magnetic recording medium which has a thin film magnetic layer considerably excellent in surface smoothness, and is excellent in electromagnetic conversion property. The magnetic recording medium of the present invention is particularly suitable as a recording medium for computers.

DETAILED DESCRIPTION OF THE INVENTION

The magnetic recording medium of the present invention will be described in detail hereinafter.

In an example of the magnetic recording medium of the present invention, a lower non-magnetic layer having a thickness of 0.3 to 2.5 μm is formed on one surface of a non-magnetic support, an upper magnetic layer having a thickness of 0.03 to 0.30 μm is formed on the lower non-magnetic layer, and further a back coat layer is formed on the other surface of the non-magnetic support. In the present invention, a lubricant coating film, and various coating films for protecting the magnetic layer may be formed on the magnetic layer if necessary. An undercoat layer (adhesive layer) may be formed on the surface of the non-magnetic support on which the magnetic layer is to be formed, in order to improve adhesion of the coating film and the non-magnetic support, and other effect.

The above-mentioned magnetic recording medium wherein 7 to 23 μg of PO$_4^{3-}$ ions are extracted per 10 mm$^3$ of the volume of the lower non-magnetic layer or the above-mentioned magnetic recording medium wherein 8 to 22 μg of Mg$^{2+}$ ions are extracted per 10 mm$^3$ of the volume of the lower non-magnetic layer can be produced by adding a phosphorus compound or a magnesium compound to a non-magnetic inorganic powder (such as an iron oxide powder) used for the lower non-magnetic layer, or adhering a phosphorus compound or a magnesium compound to the surface of an iron oxide powder, or by adding a phosphorus compound or a magnesium compound to a coating for forming the lower non-magnetic layer when the coating is prepared.

[Lower Non-magnetic Layer]

The lower non-magnetic layer comprises carbon black, a non-magnetic inorganic powder other than the carbon black, and a binder resin. The non-magnetic inorganic powder other than the carbon black comprises acicular iron oxide powder.

The carbon black comprised in the non-magnetic layer may be furnace black for rubber, thermal black for rubber, black for color, acetylene black or the like. It is preferred that the specific area thereof is from 5 to 600 m$^2$/g, the DBP oil absorption thereof is from 30 to 400 mL/100 g, and the particle size thereof is from 10 to 100 nm. For the carbon black which can be used, specifically, "carbon black guide book" edited by the Carbon Black Association of Japan can be referred to.

It is preferable that the content of water-soluble sodium ions or water-soluble calcium ions in the carbon black is smaller. The content of the water-soluble sodium ions is preferably 500 ppm or less by weight, more preferably 300 ppm or less by weight. The content of the water-soluble calcium ions is preferably 300 ppm or less by weight, more preferably 200 ppm or less by weight. If the content of the sodium or calcium ions is over the above-mentioned range, the ions are combined with molecules of an organic acid (in particular, fatty acid) contained in the coating film so as to form a salt. As a result, the salt may seep out to the surface of the coating film to cause an increase in dropouts or the error rate of the recording medium.

The amount of the carbon black incorporated into the lower non-magnetic layer is from 5 to 30% by weight, preferably from 10 to 20% by weight of the lower non-magnetic layer.

The lower non-magnetic layer comprises an acicular iron oxide powder as the non-magnetic inorganic powder other than the carbon black.

The acicular iron oxide is generally obtained by generating an iron oxyhydroxide powder by use of a known wet reaction method such as the following:

(i) a method of adding an aqueous alkali hydroxide solution to a ferrous salt solution to yield a suspension containing ferrous hydroxide colloid, and sending an oxygen-containing gas into the suspension to conduct oxidization reaction, thereby generating iron oxyhydroxide; or (ii) a method of adding an aqueous alkali hydroxide solution to a ferric salt solution to yield a suspension containing ferric hydroxide colloid and subsequently hydrolyzing the colloid, thereby generating an iron oxyhydroxide powder, and next calcining the generated acicular iron oxyhydroxide at high temperature.

Before the calcining the iron oxyhydroxide, the surfaces of the acicular iron oxyhydroxide particles are covered with a phosphorus compound, and subsequently the acicular iron oxyhydroxide particles covered with the phosphorus compound are calcined, whereby acicular iron oxide powder to which the phosphorus compound is added can be yielded.

By adding a solution containing a dissolved phosphorus compound is to acicular iron oxide powder and then mixing the combined materials, an acicular iron oxide powder is prepared whose surface has the phosphorus compound adhered thereto.

As the phosphorus compound, an inorganic phosphorus compound can be used, examples of which include phosphoric acid, metaphosphoric acid, diphosphoric acid, and phosphates such as ammonium phosphate and ammonium dihydrogenphosphate.

In the case that, on the basis of the phosphorus compound added or adhered as described above, the phosphorus content in the acicular iron oxide powder corresponds to the extracted amount of PO$_4^{3-}$ ions of 7 μg or more and 23 μg or less per 10 mm$^3$ of the volume of the lower non-magnetic layer of the magnetic recording medium when the magnetic recording medium is subjected to extraction treatment with water, the dispersibility of the powder in a coating for the non-magnetic layer is considerably good so that the resultant non-magnetic layer gives considerably good surface smoothness and excellent coating film strength and durability. However, the result depends on the amount of the acicular iron oxide powder used in the lower non-magnetic layer.

If the extracted amount of the PO$_4^{3-}$ ions is less than 7 μg, such effects based on the phosphorus compound are not obtained. On the other hand, even if the phosphorus compound is incorporated into the non-magnetic layer so that the extracted amount of the PO$_4^{3-}$ ions exceeds 23 μg, such effects based on the phosphorus compound are kept in a saturation state.

Similarly, before the calcining of the iron oxyhydroxide, the surfaces of the acicular iron oxyhydroxide particles are covered with a magnesium compound, and subsequently the acicular iron oxyhydroxide particles covered with the magnesium compound are calcined, whereby acicular iron oxide powder to which the magnesium compound is added can be yielded.

By adding a solution wherein a magnesium compound is dissolved to acicular iron oxide powder and mixing them, an acicular iron oxide powder to the surface of which the magnesium compound is adhered can be yielded.

The magnesium compound may be magnesium sulfate or the like.

In the case that, on the basis of the magnesium compound added or adhered as described above, the magnesium content in the acicular iron oxide powder corresponds to the extracted amount of $Mg^{2+}$ ions of 8 μg or more and 22 μg or less per 10 $mm^3$ of the volume of the lower non-magnetic layer of the magnetic recording medium when the magnetic recording medium is subjected to extraction treatment with water, the following effects can be obtained. $Mg^{2+}$ ions are less easily combined with molecules of an fatty acid as a lubricant to form a salt than sodium ions or calcium ions. Therefore, when soluble $Mg^{2+}$ ions are present in the magnetic recording medium so that the above-mentioned specified amount of 8 μg or more and 22 μg or less can be extracted from the $Mg^{2+}$ ions, harmful effects based on sodium ions or calcium ions are prevented. This appears to be based on the following reason: $Mg^{2+}$ ions themselves are less easily combined with molecules of an fatty acid as a lubricant to form a salt than sodium ions or calcium ions and further Mg ions hinder sodium ions or calcium ions from being combined with the molecules of the fatty acid to form a salt; therefore, even if the lubricant is added to the lower non-magnetic layer in an amount necessary for the durability of the medium, the lubricant does not exude out easily in the storage or the like of the medium.

If the extracted amount of the $Mg^{2+}$ ions is less than 8 μg, such effects based on the $Mg^{2+}$ ions are not obtained. On the other hand, even if the magnesium compound is incorporated into the non-magnetic layer so that the extracted amount of the $Mg^{2+}$ ions exceeds 22 μg, such effects based on the magnesium compound are kept in a saturation state.

About the acicular iron oxide powder which is preferably used in the present invention, the average long axis length thereof is preferably 0.15 μm or less, more preferably from 0.05 to 0.10 μm. As the average long axis length of the acicular iron oxide powder is smaller if the powder can be dispersed in the coating for forming the non-magnetic layer, the surface of a medium obtained from the coating can be generally made smoother. If the average long axis length is more than 0.15 μm, the surface smoothness of the non-magnetic layer tends to deteriorate. If the average long axis length is less than 0.05 μm, the dispersibility of the powder deteriorates so that the surface smoothness of the non-magnetic layer tends to deteriorate as well.

In the present invention, the average long axis lengths of the acicular iron oxide powder and the ferromagnetic powder used in the magnetic layer can be obtained by separating and collecting the ferromagnetic powder and the acicular iron oxide powder from a medium piece and then measuring the long axis length of each powder from a photograph taken with a transmission electron microscope (TEM). One example of the steps for obtaining the length is described in the following: (1) from the medium piece, the back coat layer is wiped off with a solvent, so as to be removed; (2) the medium piece sample wherein the lower non-magnetic layer and the upper magnetic layer remain on the non-magnetic support is immersed into a 5% aqueous NaOH solution, and then solution is heated and stirred; (3) the coating film which is caused to fall out from the non-magnetic support is washed with water, and then dried; (4) the dried coating film is subjected to ultrasonic treatment in methyl ethyl ketone (MEK), and a magnetic stirrer is used to adsorb and collect the ferromagnetic powder; (5) the acicular iron oxide hydrate powder is separated from the residue and then dried; (6) the powders obtained in the above (4) and (5) are combined and put into an exclusive mesh to prepare a sample for transmission electron microscopy, and then a photograph of the acicular powder is taken with a transmission electron microscope; and (7) the lengths of long axes of particles of the photographed acicular powder are measured, and the resultant values are averaged (the number of the measured particles: n=100).

The axial ratio of the acicular iron oxide powder is preferably from 2 to 10, more preferably from 3 to 8, even more preferably from 4 to 8. In the case that the axial ratio is high in this way, when a coating containing this powder is applied onto a base film, particles of the iron oxide are arranged in the in-plane direction of the base film so that the particles get more entangled. This phenomenon contributes to an increase in the surface smoothness and the strength of the medium.

The specific surface area of the acicular iron oxide powder is preferably from 70 to 100 $m^2/g$ according to the BET method. If the specific surface area is more than 100 $m^2/g$, the dispersibility of the iron oxide particles in the non-magnetic layer coating deteriorates. On the other hand, if the specific surface area is less than 70 $m^2/g$, the particles easily undergo aggregation or sintering.

The amount of the acicular iron oxide powder in the lower non-magnetic layer is from 40 to 80% by weight, preferably from 45 to 70% by weight of the layer. If the amount is less than 40% by weight, the amount of the binder resin in the lower non-magnetic layer increases so that the magnetic recording medium, when being made into a tape, is easily warped to a large extent along the tape width direction. As a result, the tape tends to fall into poor contact with a head. On the other hand, if the amount is more than 80% by weight, the amount of the binder resin in the lower non-magnetic layer lowers so that a sufficient coating film strength cannot be obtained.

In the lower non-magnetic layer, as the non-magnetic inorganic powder other than the carbon black, various non-magnetic inorganic powders can be appropriately used, besides the acicular iron oxide powder, in such an amount that the attainment of the objects of the present invention is not damaged. Examples of the non-magnetic inorganic powders include calcium carbonate, titanium oxide, barium sulfate, and aluminum oxide ($\alpha$-$Al_2O_3$). Such an amount that the attainment of the objects of the present invention is not damaged is, for example, about 1 to 10% by weight in the lower non-magnetic layer. When the amount of the non-magnetic inorganic powders is within this range, the powders give a satisfactory coating film strength while keeping good dispersibility when the coating for forming the lower non-magnetic layer is prepared.

Besides the above-mentioned material, the following is used as a binder in the lower non-magnetic layer: a combination that is appropriately selected from thermoplastic resins, thermosetting or thermoreactive resins, radiation (electron ray- or ultraviolet ray-) curable resins and other resins in accordance with the property of the medium or conditions for the production process thereof.

Of these combinations, preferable is a combination of a vinyl chloride type copolymer with a polyurethane resin.

The vinyl chloride type copolymer is preferably one having a vinyl chloride content of 60 to 95% by weight, and is more preferably one having a vinyl chloride content of 60 to 90% by weight. The average polymerization degree thereof is preferably from about 100 to 500. Particularly preferable is a copolymer made from vinyl chloride and a monomer having an epoxy (glycidyl) group.

The polyurethane resin, which is used together with the vinyl chloride type resin, is a generic name given to resins obtained by reaction of hydroxyl-containing resins, such as polyester polyol and/or polyether polyol, with polyisocyanate-containing compounds. The number-average molecular weight thereof is from about 5,000 to 200,000, and the Q value (i.e., the weight-average molecular weight/the number-average molecular weight) thereof is from about 1.5 to 4.

The non-magnetic layer may comprise various known resins besides the vinyl chloride type copolymer and the polyurethane resin.

As a crosslinking agent for curing these binder resins, various polyisocyanates, in particular, diisocyanate can be used. It is particularly preferable to use one or more selected from tolylene diisocyanate, hexamethylene diisocyanate and methylene diisocyanate. The content of the crosslinking agent is preferably from 10 to 30 parts by weight for 100 parts by weight of the binder resin(s). In order to cure such a thermosetting resin, it is generally advisable to heat the resin at 50 to 70° C. in a heating oven for 12 to 48 hours.

It is allowable to use the above-mentioned binder resin(s) the electron beam sensitivity of which is modified by the introduction of (meth)acrylic double bonds into the resin in a known manner.

When the electron beam curing binder resin(s) is/are used, a known polyfunctional acrylate may be used in an amount of 1 to 50 parts by weight, preferably 5 to 40 parts by weight for 100 parts by weight of the binder resin(s) in order to improve the crosslinking rate of the resin(s).

The content of the binder resin(s) used in the lower non-magnetic layer is preferably from 10 to 100 parts by weight, more preferably from 12 to 30 parts by weight for 100 parts by weight of the total of the carbon black and the non-magnetic inorganic powder other than the carbon black in the lower non-magnetic layer. If the content of the binder(s) is too small, the ratio of the binder resin(s) in the lower non-magnetic layer lowers so that a sufficient coating film strength cannot be obtained. If the content of the binder is too large, the medium, when being made into a tape, is easily warped along the width direction of the tape. Consequently, the state of contact between the tape and a head tends to get bad.

It is preferred that the lower non-magnetic layer comprises a lubricant if necessary. The lubricant may be saturated or unsaturated, and may be a known lubricant, examples of which include fatty acids such as stearic acid and myristic acid; fatty acid esters such as butyl stearate and butyl palmitate; and sugars. These may be used alone or in a mixture of two or more thereof. It is preferred to use a mixture of two or more fatty acids having different melting points, or a mixture of two or more fatty acid esters having different melting points. This is because it is necessary to supply lubricants adapted to all temperature environments in which the magnetic recording medium is used onto the surface of the medium without interruption.

The lubricant content in the lower non-magnetic layer may be appropriately adjusted in accordance with purpose, and is preferably from 1 to 20% by weight of the total weight of the carbon black and the non-magnetic inorganic powder other than the carbon black.

A coating for forming the non-magnetic layer is prepared by adding an organic solvent to the above-mentioned components and subjecting the resultant to mixing, stirring, kneading, dispersing and other treatments in a known manner. The used solvent is not limited to any especial kind, and may be appropriately selected from various solvents such as ketone solvents (such as methyl ethyl ketone, methyl isobutyl ketone, and cyclohexane) and aromatic solvents (such as toluene). These may be used alone or in combination of two or more thereof. The amount of the added organic solvent is set into the range of about 100 to 900 parts by weight for 100 parts by weight of the total of the carbon black, the non-magnetic inorganic powder(s) other than the carbon black, and the binder resin(s).

The thickness of the lower non-magnetic layer is usually from 0.3 to 2.5 µm, preferably from 0.3 to 2.3 µm. If the lower non-magnetic layer is too thin, the layer is easily affected by the surface roughness of the non-magnetic support so that the surface smoothness of the lower non-magnetic layer deteriorates and, also, the surface smoothness of the magnetic layer deteriorates easily. Consequently, the electromagnetic property thereof tends to deteriorate. On the other hand, if the non-magnetic layer is made thicker than some value, the performance thereof is not improved.

In the case that the lower non-magnetic layer is worked before the upper magnetic layer is applied, the centerline average roughness (Ra) of the lower non-magnetic layer surface is preferably from 1 to 5 nm, more preferably from 1 to 3 nm. If the Ra is more than 6 nm, the magnetic layer surface gets rough. As a result, the electromagnetic conversion properties thereof, such as the reproducing output thereof, deteriorate in a reproducing system using an MR head.

[Upper Magnetic Layer]

The upper magnetic layer comprises at least a ferromagnetic powder and a binder resin.

The average long axis length of the ferromagnetic powder is preferably 0.1 µm or less. The use of the ferromagnetic powder having the short long axis length causes the filling rate in the coating film to be raised so that the electromagnetic conversion property is improved. The average long axis length of a preferred example of the ferromagnetic powder is from 0.03 to 0.10 µm. If the average long axis length of the ferromagnetic powder is more than 0.1 µm, the electromagnetic conversion property tends to deteriorate. On the other hand, if the average long axis length is less than 0.03 µm, the magnetic anisotropy weakens so that the powder is not easily oriented. Consequently, the output of the magnetic layer is apt to lower.

In the present invention, the ferromagnetic powder is preferably a metal magnetic powder or a planar hexagonal fine powder. The metal magnetic powder preferably has a coercive force Hc of 118.5 to 237 kA/m (1500 to 3000 Oe), a saturation magnetization as of 120 to 160 $Am^2$/kg (emu/g), an average long axis length of 0.03 to 0.1 µm, an average short axis length of 10 to 20 nm, and an aspect ratio of 1.2 to 20. The Hc of the medium produced by use of the metal magnetic powder is preferably from 118.5 to 237 kA/m (1500 to 3000 Oe). The planar hexagonal fine powder preferably has a coercive force Hc of 79 to 237 kA/m (1000 to 3000 Oe), a saturation magnetization as of 50 to 70 $Am^2$/kg (emu/g), an average planar particle size of 30 to 80 nm and a plate ratio of 3 to 7. The Hc of the medium produced by use of the planar hexagonal fine powder is preferably from 94.8 to 173.8 kA/m (1200 to 2200 Oe).

In this context, the average long axis length of the ferromagnetic powder is as described about the acicular iron oxide powder of the non-magnetic layer.

When the ferromagnetic powder is produced, aluminum, yttrium or the like is usually used as a sintering inhibitor. As the sintering inhibitor, a phosphorus compound is not usually used.

As a dispersant for magnetic layers, a phosphoric acid ester which is an organic phosphorus compound is used in many cases. The oxygen-carbon bond linked to the phosphorus in this phosphoric acid ester is not any ionic bond and is not electrically dissociated with ease. Therefore, when the magnetic recording medium of the present invention is subjected to extraction treatment with water, this phosphoric acid ester is not extracted as a $PO_4^{3-}$ ion. For example, when the magnetic recording medium using a phosphoric acid ester: R—O—P(=O)(OH)$_2$, wherein R represents an organic group such as an alkyl, is subjected to extraction treatment with water, the phosphoric acid ester is not extracted as a $PO_4^{3-}$ ion.

The content of the water-soluble sodium ions contained in the ferromagnetic powder is preferably 70 ppm or less by weight, more preferably 50 ppm or less by weight. The content of the water-soluble calcium ions contained therein is preferably 30 ppm or less by weight, more preferably 20 ppm or less by weight. If the content of the sodium ions or calcium ions is over the above-mentioned range, the ions are combined with molecules of an organic acid (in particular, fatty acid) contained in the coating film so as to form a salt. As a result, the salt seeps out to the surface of the coating film to cause an increase in dropouts or the error rate of the magnetic recording medium. The lower non-magnetic layer of the magnetic recording medium of the present invention comprises a magnesium compound in an amount corresponding to the following $Mg^{2+}$ ion extracted amount: when the magnetic recording medium is subjected to extraction treatment with water, a $Mg^{2+}$ ion extracted amount of 8 to 22 μg per 10 mm$^3$ of the volume of the lower non-magnetic layer of the magnetic recording medium. As described above, this magnesium compound restrains sodium ions or calcium ions from being combined with molecules of the fatty acid to form a salt.

It is advisable that the magnetic layer comprises the ferromagnetic powder in an amount of about 70 to 90% by weight of the layer. If the content of the ferromagnetic powder is too large, the content of the binder decreases so that the surface smoothness deteriorates easily by calendering. On the other hand, if the content of the ferromagnetic powder is too small, a high reproducing output cannot be obtained.

The binder agent for the magnetic layer is not limited to any especial kind, and the following may be used: a combination that is appropriately selected from thermoplastic resins, thermosetting or thermoreactive resins, radiation (electron ray- or ultraviolet ray-) curable resins and other resins in accordance with the property of the medium or conditions for the production process thereof. The binder resin which can be used may be appropriately selected from the same binders as described about the lower non-magnetic layer.

The content of the binder resin used in the magnetic layer is preferably from 5 to 40 parts by weight, more preferably from 10 to 30 parts by weight for 100 parts by weight of the ferromagnetic powder. If the content of the binder is too small, the strength of the magnetic layer lowers so that the running durability of the medium deteriorates easily. On the other hand, if the content of the binder is too large, the content of the ferromagnetic powder lowers so that the electromagnetic conversion property tends to deteriorate.

The magnetic layer further contains an abrasive having a Mohs hardness of 6 or more, such as α-alumina (Mohs hardness: 9), for the purposes of increasing the mechanical strength of the magnetic layer and preventing clogging of the magnetic head. Such an abrasive usually has an indeterminate form, causes the magnetic head to be prevented from clogging, and causes the strength of the coating film to be improved.

The average particle size of the abrasive is, for example, from 0.01 to 0.2 μm, preferably from 0.05 to 0.2 μm. If the average particle size of the abrasive is too large, then the projections from the surface of the magnetic layer become significant, causing a decrease in the electromagnetic conversion characteristics, an increase in the drop-outs, and an increase in the head wear. Conversely, if the average particle size of the abrasive is too small, then the projections from the surface of the magnetic layer will become relatively small, leading to insufficient prevention of clogged heads.

The average particle size is usually measured with a transmission electron microscope. The content of the abrasive may be from 3 to 25 parts by weight, preferably from 5 to 20 parts by weight for 100 parts by weight of the ferromagnetic powder.

If necessary, various additives may be added to the magnetic layer, examples of the additives including dispersants such as a surfactant, and lubricants such as higher fatty acid, fatty acid ester, and silicone oil.

A coating for forming the magnetic layer is prepared by adding an organic solvent to the above-mentioned components and subjecting the resultant to mixing, stirring, kneading, dispersing and other treatments in a known manner. The organic solvent to be used is not limited to any especial kind, and may be the same as used in the lower non-magnetic layer.

The thickness of the magnetic layer is preferably from 0.03 to 0.30 μm, more preferably from 0.10 to 0.25 μm. If the magnetic layer is too thick, the self demagnetization loss or thickness loss thereof increases.

The centerline average roughness (Ra) of the magnetic layer surface is preferably from 1.0 to 5.0 nm, more preferably from 1.0 to 4.0 nm. If the Ra is less than 1.0 nm, the surface is too smooth so that the running stability deteriorates. As a result, troubles are easily caused during running of the recording medium. On the other hand, if the Ra is more than 5.0 nm, the magnetic layer surface gets rough. As a result, the electromagnetic conversion properties of the magnetic recording medium, such as the reproducing output thereof, deteriorate in a reproducing system using an MR head.

[Back Coat Layer]

The back boat layer is formed to improve the running stability of the magnetic recording medium, prevent the electrification of the magnetic layer and attain others, and comprises carbon black, a non-magnetic inorganic powder other than the carbon black, and a binder resin.

The back coat layer preferably comprises the carbon black in an amount of 30 to 80% by weight of the back coat layer. If the content of the carbon black is too small, the electrification-preventing effect tends to lower and the running stability falls easily. Moreover, the light transmittance of the medium is apt to become high. Consequently, a problem is caused in case of the manner of detecting the end of the medium by a change in the light transmittance. On the other hand, if the content of the carbon black is too large, the strength of the back coat layer lowers so that the running durability deteriorates easily. The carbon black may be any carbon black that is ordinarily used. The average particle size thereof is preferably from about 5 to 500 nm. The average particle size is usually measured with a transmission electron microscope.

The amounts of water-soluble sodium ions and water-soluble calcium ions contained in the carbon black are preferably small. The content of the water-soluble sodium ions is preferably 500 ppm or less by weight, more preferably 300 ppm or less by weight, and the content of the water-soluble calcium ions is preferably 300 ppm or less by weight, more preferably 200 ppm by weight. If the content of the sodium ions or the calcium ions is over this range, the ions are combined with molecules of an organic acid (in particular, fatty acid) contained in the coating film so as to form a salt. As a result, the salt may seep out to the surface of the coating film to cause an increase in dropouts or the error rate of the magnetic recording medium.

The non-magnetic inorganic powder other than the carbon black, which contained in the back coat layer, may be selected from various non-magnetic inorganic powders in order to control the mechanical strength of this layer. Examples of the inorganic powder include $\alpha$-$Fe_2O_3$, $CaCO_3$, titanium oxide, barium sulfate, and $\alpha$-$Al_2O_3$ powders. The content of the non-magnetic inorganic powder is preferably from 0.1 to 20 parts by weight, more preferably from 0.5 to 15 parts by weight for 100 parts by weight of the carbon black. The average particle size of the non-magnetic inorganic powder is preferably from 0.01 to 0.5 µm. If the content of this non-magnetic inorganic powder is too small, the mechanical strength of the back coat layer easily becomes insufficient. If the content is too large, the abrasion loss of guides or some other member in a path on which the magnetic recording medium is slid easily becomes large or the magnetic layer is scratched.

Besides the above-mentioned material, the following is used as a binder in the back coat layer: a combination that is appropriately selected from thermoplastic resins, thermosetting or thermoreactive resins, radiation (electron ray- or ultraviolet ray-) curable resins and other resins in accordance with the property of the medium or conditions for the production process thereof. The binder which can be used may be appropriately selected from the same binders as described about the lower non-magnetic layer.

The content of the binder resin used in the back coat layer is preferably from 15 to 200 parts by weight, more preferably from 50 to 180 parts by weight for 100 parts by weight of the total of the carbon black and the non-magnetic inorganic powder in the back coat layer. If the content of the binder resin is too large, the friction between the magnetic recording medium and guide rolls or some other member in the path on which the recording medium is slid increases excessively so that the running stability of the medium deteriorates. As a result, accidents are easily caused in the running. Moreover, problems, such as blocking between the back coat layer and the magnetic layer, are caused. If the content of the binder resin is too small, the strength of the back coat layer lowers so that the running durability of the medium deteriorates easily.

If necessary, various additives may be added to the back coat layer, examples of the additives including dispersants such as a surfactant, and lubricants such as higher fatty acid, fatty acid ester, and silicone oil.

A coating for forming the back coat layer is prepared by adding an organic solvent to the above-mentioned components and subjecting the resultant to mixing, stirring, kneading, dispersing and other treatments in a known manner. The used solvent is not limited to any especial kind, and may be the same as used in the lower non-magnetic layer. It is advisable that the adding amount of the organic solvent is from about 100 to 900 parts by weight for 100 parts by weight of the total of the carbon black, the various inorganic powders other than the carbon black, and the binder resin.

The thickness of the back coat layer is 1.0 µm or less, preferably from 0.1 to 1.0 µm, more preferably from 0.2 to 0.8 µm (after the layer is calendered). If the back coat layer is too thick, the friction between the magnetic recording medium and guide rolls or some other member in the path on which the magnetic recording medium is slid increases excessively so that the running stability of the medium deteriorates. On the other hand, if the back coat layer is too thin, the back coat layer is easily scratched when the medium running.

[Non-magnetic Support]

The material used for the non-magnetic support is not particularly limited, and may be selected from various flexible materials and various rigid materials in accordance with purpose. The material is made into a give form, such as a medium form, and a given size in accordance with various standard specifications. Examples of the flexible materials include polyesters such as polyethylene terephthalate and polyethylene naphthalate; polyolefins such as polypropylene; polyamides; polyimides; and polycarbonates.

The thickness of the non-magnetic support is preferably from 3.0 to 15.0 µm. The form of the non-magnetic support is not particularly limited, and may be any one selected from tape, sheet, card, disc and other forms. In accordance with the form or circumferences, various materials may be selected and used.

The surface roughness of the non-magnetic support used in the present invention is 20 nm or less, preferably 15 nm or less as the centerline average surface roughness Ra thereof. The surface roughness of the non-magnetic support is freely controlled by the size and the amount of filler added to the non-magnetic support if necessary. Examples of the filler include oxides and carbonates of Ca, Si, Ti and Al; and organic resin fine powders such as acrylic resin fine powder. Preferable is a combination of $Al_2O_3$ with organic resin fine powder.

[Production of Magnetic Recording Medium]

In the present invention, prepared coatings for forming the non-magnetic layer, for forming the magnetic layer, and for forming the back coat layer are used and subjected to applying, drying, calendering, curing and other treatments so as to form respective coating films (coating layers). In this way, a magnetic recording medium can be produced.

In the present invention, the lower non-magnetic layer and the upper magnetic layer may be formed in a wet-on-wet coating or a wet-on-dry coating manner. The layers are preferably formed in the wet-on-dry coating manner. In the case of the wet-on-dry coating manner, the coating for the non-magnetic layer is first applied onto one surface of the non-magnetic support, dried and optionally calendered. Thereafter, the coating is cured to form the lower non-magnetic layer. Next, the coating for the magnetic layer is applied onto the cured lower non-magnetic layer, oriented, and dried to form the upper magnetic layer.

The order of the step of forming the lower non-magnetic layer, the step of forming the upper magnetic layer, the step of the forming the back coat layer, and the curing treatment can be appropriately changed.

According to the wet-on-dry coating manner, there is not caused disturbance in the interface between the non-magnetic layer and the magnetic layer, as is seen in the wet-on-wet coating manner, wherein the magnetic layer is applied while the non-magnetic layer is in a wet state. Moreover, according to the wet-on-dry coating manner, the thickness of the obtained magnetic layer can be made even. Furthermore, in the case that the lower non-magnetic layer is subjected to calendering treatment before the application and formation of the upper magnetic layer, a smoother surface of the magnetic layer can be obtained so that excellent electromagnetic conversion property can be obtained. Thus, this case is preferable. In the present invention, the surface smoothness of the lower non-magnetic layer is improved since the coating for the non-magnetic layer comprises an acicular iron oxide hydrate powder excellent in dispersibility. These make it possible to make the obtained magnetic layer excellent in electromagnetic conversion property.

The method used for applying the above-mentioned coatings may be any one selected from known various coating methods such as gravure coating, reverse roll coating, die nozzle coating, and bar coating.

EXAMPLES

The present invention will be more specifically described by way of the following examples. However, the present invention is not limited to only these examples.

[Preparation of Acicular Iron Oxide Powder (A)]

Into 50 liters of pure water was put 1000 g of iron oxyhydroxide (α-FeOOH) having an average long axis length of 150 nm, and then a 0.1 N aqueous KOH solution was added thereto so as to adjust the pH of the solution to 10.2. Next, to the solution were added 500 g of an aqueous yttrium sulfate solution having a Y concentration of 2.0% by weight and 750 g of an aqueous phosphoric acid solution having a P concentration of 2.0% by weight while the solution was stirred. Furthermore, 200 g of magnesium sulfate was added to the solution. The stirring was continued and then the reaction was finished.

The slurry containing iron oxyhydroxide, which was surface-treated as described above, was filtrated, washed with water, and dried to yield iron oxyhydroxide covered with the yttrium compound, the phosphorus compound, and the magnesium compound.

This iron oxyhydroxide was calcined as follows. The iron oxyhydroxide was charged into a rotary furnace made of stainless steel. While the furnace was driven to be rotated, the iron oxyhydroxide was subjected to dehydrating treatment at 600° C. for 30 minutes, so as to be converted to iron oxide. Thereafter, the product was taken from the rotary furnace to the atmosphere at room temperature. In this way, an iron oxide powder (A) was obtained.

[Preparation of Acicular Iron Oxide Powder (B)]

An iron oxide powder (B) was obtained in the same manner as in the preparation of the iron oxide powder (A) except that iron oxyhydroxide having an average long axis length of 100 nm was used and further the amount of the added aqueous phosphoric acid solution and that of the added magnesium sulfate were changed to 300 g and 100 g, respectively, in the surface-treatment of the iron oxyhydroxide.

[Preparation of Acicular Iron Oxide Powder (C)]

An iron oxide powder (C) was obtained in the same manner as in the preparation of the iron oxide powder (A) except that iron oxyhydroxide having an average long axis length of 120 nm was used and further the aqueous phosphoric acid solution and the magnesium sulfate were not added and 750 g of colloidal silica (SiO) was added in the surface-treatment of the iron oxyhydroxide.

The average long axis length, the average short axis length, the axial ratio, the BET specific surface area of each of the iron oxide powders (A), (B) and (C) are shown in Table 1.

Example 1

| (Preparation of non-magnetic coating) | |
|---|---|
| Acicular iron oxide (A) | 80.0 parts by weight |
| Carbon black (trade name: #950B, manufactured by Mitsubishi Chemical Co., Ltd., average particle: 17 nm, BET specific surface area: 250 m$^2$/g, DBP oil absorption: 70 mL/100 g, pH: 8) | 20.0 parts by weight |
| Vinyl chloride resin (trade name: TB-0246, manufactured by Toyobo Co., Ltd., (solid content) vinyl chloride/epoxy-containing monomer copolymer, average polymerization degree: 310, content of S based on the use of potassium persulfate: 0.6% by weight, MR110 (manufactured by Nippon Zeon Corp.) subjected to acrylic modification with 2-isocyanate ethyl methacrylate (MOI), acryl content: 6 mol/1 mol) | 11.0 parts by weight |
| Polyurethane resin (trade name: TB-0216, manufactured by Toyobo Co., Ltd., (solid content) hydroxy-containing acrylic compound/phosphonic acid group-containing phosphorus compound/hydroxy-containing polyester polyol, average molecular weight: 13,000, P content: 0.2% by weight, acryl content: 8 mol/1 mol) | 9.0 parts by weight |
| Dispersant, phosphoric acid ester (surfactant) (trade name: RE610, manufactured by TOHO Chemical Industry Co., Ltd.) | 3.2 parts by weight |
| Abrasive, α-alumina (tradename: HIT60A, manufactured by Sumitomo Chemical Co., Ltd., average particle size: 0.18 μm) NV (solid concentration) = 33% by weight Solvent ratio: MEK/toluene/cyclohexanone = 2/2/1 (ratio by weight) | 5.0 parts by weight |

The above-mentioned materials from which a part of the organic solvent was removed were subjected to kneading treatment with a kneader. Next, the rest of the organic solvent was added to the kneaded materials, and then the mixture was sufficiently stirred in a dissolver. Thereafter, the mixture was dispersed in a lateral type pin mill, filled with zirconia beads of 0.8 mm diameter at a filling rate of 80% (percentage of voids: 50% by volume). Thereafter, to this dispersion were added the following lubricant materials:

0.5 part by weight of lubricant, fatty acid (trade name: NAA180, manufactured by NFO Corp.), 0.5 part by weight of lubricant, fatty acid amide (trade name: Fatty Acid AMIDE S, manufactured by Kao Corp.), and 1.0 part by weight of lubricant, fatty acid ester (trade name: NIKKOL BS, manufactured by Nikko Chemicals Co., Ltd.), and the dispersion was diluted to have a NV (solid concentration) of 25% by weight and the following solvent ratio by weight: MEK/toluene/cyclohexanone=2/1/1. The mixture was dispersed. The resultant coating was filtrated through a filter having an absolute filtration precision of 3.0 μm to prepare a non-magnetic coating.

| (Preparation of magnetic coating) | |
|---|---|
| Magnetic powder, Fe-based acicular ferromagnetic powder (Fe/Co/Al/Y = 100/24/5/8 (atomic ratio), Hc: 188 kA/m, σs: 140 Am$^2$/kg, BET specific surface area: 50 m$^2$/g, average long axis length: 0.10 μm) | 100.0 parts by weight |
| Binder resin, vinyl chloride copolymer (trade name: MR110, manufactured by Nippon Zeon Corp.) | 10.0 parts by weight |
| Binder resin, polyester polyurethane (trade name: UR8300, manufactured | 6.0 parts by weight |

(Preparation of magnetic coating) -continued

| | |
|---|---|
| by Toyobo Co., Ltd.) | |
| Dispersant, phosphoric acid ester (surfactant) (trade name: RE610, manufactured by TOHO Chemical Industry Co., Ltd.) | 3.0 parts by weight |
| Abrasive, α-alumina (trade name: HIT60A, manufactured by Sumitomo Chemical Co., Ltd., average particle size: 0.18 μm) NV (solid concentration) = 30% by weight Solvent ratio: MEK/toluene/cyclohexanone = 4/4/2 (ratio by weight) | 10.0 parts by weight |

The above-mentioned materials from which a part of the organic solvent was removed were subjected to kneading treatment with a kneader. Next, the rest of the organic solvent was added to the kneaded materials, and then the mixture was sufficiently stirred in a dissolver. Thereafter, the mixture was subjected to preparatory dispersion in a lateral type pin mill, filled with zirconia beads of 0.8 mm diameter at a filling rate of 80% (percentage of voids: 50% by volume). Thereafter, the dispersion was further diluted so as to have a NV (solid concentration) of 15% by weight and the following solvent ratio by weight: MEK/toluene/cyclohexanone=22.5/22.5/55. The mixture was then subjected to finishing dispersion.

To the resultant coating were added 10 parts by weight of a curing agent (trade name: COLONATE L, manufactured by Nippon Polyurethane Industry Co., Ltd.), and then they were mixed. Thereafter, the mixture was filtrated through a filter having an absolute filtration precision of 1.0 μm to prepare a magnetic coating.

(Preparation of back coat coating)

| | |
|---|---|
| Carbon black (trade name: BP-800, manufactured by Cabot Corp., average particle size: 17 nm, DBP oil absorption: 68 mL/100 g, BET specific surface area: 210 m$^2$/g) | 75 parts by weight |
| Carbon black (trade name: BP-130, manufactured by Cabot Corp., average particle size: 75 nm, DBP oil absorption: 69 mL/100 g, BET specific surface area: 25 m$^2$/g) | 10 parts by weight |
| Calcium carbonate (trade name: HAKUENKAO, manufactured by Shiraishi Kogyo, average particle size: 30 nm) | 15 parts by weight |
| Nitrocellulose (trade name: BTH1/2, manufactured by Asahi Kasei Corp.) | 65 parts by weight |
| Polyurethane resin (aliphatic polyester diol/aromatic polyester diol = 43/53) NV (solid concentration) = 30% by weight Solvent ratio: MEK/toluene/cyclohexanone = 1/1/1 (ratio by weight) | 35 parts by weight |

The above-mentioned materials from which a part of the organic solvent was removed were subjected to kneading treatment with a kneader. Next, the rest of the organic solvent was added to the kneaded materials, and then the mixture was sufficiently stirred in a dissolver. Thereafter, the mixture was dispersed in a lateral type pin mill, filled with zirconia beads of 0.8 mm diameter at a filling rate of 80% (percentage of voids: 50% by volume). Thereafter, the dispersion was further diluted so as to have a NV (solid concentration) of 10% by weight and the following solvent ratio by weight: MEK/toluene/cyclohexanone=5/4/1. The mixture was then dispersed. To the coating obtained in this way were added 5 parts by weight of a curing agent (trade name: COLONATE L, manufactured by Nippon Polyurethane Industry Co., Ltd.), and then they were mixed. Furthermore, the mixture was filtrated through a filter having an absolute filtration precision of 1.0 μm to prepare a back coat coating.

The magnetic coating, non-magnetic coating and back coat coating obtained as described above were used to produce a sample of a magnetic recording medium as follows.

(Step of Applying Non-magnetic Layer Coating)

The non-magnetic coating was applied onto one surface of a PEN support of 6.2 μm thickness by extrusion coating method using a nozzle, so as to make the thickness of the applied coating after the following calendering into 2.0 μm. The coating was dried, and subsequently the resultant layer was calendered with a calender composed of combinations of a plastic roll with a metal roll under the following conditions: the nip number: 4, working temperature: 100° C., linear pressure: 3500 N/cm, and velocity: 150 m/s. Furthermore, the resultant was irradiated with electron rays at 4.5 Mrad, so as to form a non-magnetic layer.

(Step of Applying Magnetic Layer Coating and Back Coat Layer Coating)

The magnetic coating was applied from a nozzle onto the non-magnetic layer formed as described above so as to make the thickness of the applied coating after the following calendering into 0.1 μm. The coating was oriented and dried, and subsequently the resultant layer was calendered with a calender composed of combinations of a plastic roll with a metal roll under the following conditions: the nip number: 4, working temperature: 100° C., linear pressure: 3500 N/cm, and velocity: 150 m/s, so as to form a magnetic layer. Furthermore, the back coat layer coating was applied from a nozzle onto the other surface of the PEN support so as to make the thickness of the applied coating dried after the following drying into 0.6 μm. The coating was dried, and subsequently the resultant layer was calendered with a calender composed of combinations of a plastic roll with a metal roll under the following conditions: the nip number: 4, working temperature: 80° C., linear pressure: 3500 N/cm, and velocity: 150 m/s, so as to form a back coat layer.

The magnetic recording tape web obtained as described above was cured at 60° C. for 48 hours, and then slit into a width of ½ inch to produce a tape for data as a magnetic recording tape sample of Example 1.

Example 2

A magnetic tape was obtained in the same way as in Example 1 except that the acicular iron oxide (B) was used instead of the acicular iron oxide (A) in the preparation of the non-magnetic coating.

Comparative Example 1

A magnetic tape was obtained in the same way as in Example 1 except that the acicular iron oxide (C) was used instead of the acicular iron oxide (A) in the preparation of the non-magnetic layer coating.

[Evaluation of Magnetic Tape]

(Surface roughness (centerline surface roughness): Ra)

A system (trade name: TALYSTEP SYSTEM, manufactured by Taylor Hobson Co.) was used to measure the Ra of the magnetic layer surface of each of the magnetic tapes on the basis of JIS B0601-1982.

Conditions for the measurement were made as follows: filter: 0.18 to 9 Hz, stylus: 0.1×2.5 μm stylus, stylus pressure: 2 mg, measuring speed: 0.03 mm/sec, and measuring length: 500

(Error Rate)

Each of the magnetic tape samples, integrated into a cartridge, was loaded into a driver (trade name: Ultrium 230, manufactured by HP (Hewlett Packard) Co.) to measure the error rate thereof. The measurement was made by use of SCSI control software. Random data of 8 Gbit were recorded on the tape from its data area starting position. At this time, $\log_{10}X$, wherein X represents a value obtained by dividing the number of correctable C1 errors extracted with the SCSI control software by 8 Gbit, was defined as the W-bER. The W-bER is an abbreviation of write bit error rate.

(Friction Durability)

A friction durability test of the magnetic layer surface of each of the tapes was made in order to evaluate the coating film strength and the durability thereof.

A lateral type high-speed tension tester (Model No. HTB-S) manufactured by Island Industries Co., Ltd. was used to make the test. Conditions for the measurement were as follows: embracing angle: 90°, load: 40 g, and measuring speed: 1524 mm/min.

The magnetic layer was passed (or slid), by a length of 50 mm, on the tester. This was repeated 300 times. The measured value obtained after the first pass was defined as the initial friction. The measured value obtained after the 300$^{th}$ pass was defined as the friction durability. When a friction coefficient more than 0.2 was obtained, the magnetic layer was regarded as a no-good.

(Seepage of Salt of Lubricant)

Each of the magnetic tapes was stored in a thermostat the environment of which was set to high temperature and high humidity (50° C. and 80% RH) for 5 days. The magnetic layer surface of the tape after the storage was observed with a microscope to check whether any one of the lubricants seeped or not.

The results about the above-mentioned magnetic tape properties are shown in Table 1.

TABLE 1

Magnetic tape properties

|  | Example 1 | Example 2 | Comparative Example 1 |
|---|---|---|---|
| Acicular iron oxide in lower non-magnetic layer | A | B | C |
| Average long axis length (nm) | 140 | 95 | 110 |
| Average short axis length (nm) | 25 | 15 | 18 |
| Axial ratio | 5.6 | 6.3 | 6.1 |
| BET (m²/g) | 72 | 82 | 55 |
| Tape properties |  |  |  |
| Surface roughness Ra (nm) | 3.3 | 2.9 | 4.0 |
| Error rate (W-bER) | −7.6 | −7.8 | −6.8 |
| Friction durability |  |  |  |
| 1$^{st}$ pass | 0.18 | 0.18 | 0.18 |
| 300$^{th}$ pass | 0.18 | 0.18 | 0.25 |
| Seepage of lubricant salt | Not observed | Not observed | Observed |

(Method for Extracting Magnetic Recording Tape with Water)

Each of the tape samples of ½ inch width and 1 m length was put into a 100-mL beaker, and 40 mL of pure water was put into the beaker to immerse the sample. The beaker was covered with a film, and then shaken in a hot water bath at 60 to 70° C. for 1 hour. The beaker was allowed to stand still all night to be cooled. Thereafter, the liquid was filtrated. The resultant filtrate was used as an analyzing liquid. The analyzing liquid was subjected to the following ICP (high frequency inductively coupled plasma) emission spectrometry and IC (Ion Chromatography) analysis so as to obtain the amount of each of elements or ion species extracted from the tape sample of 1 m length.

ICP (High Frequency Inductively Coupled Plasma) Emission Spectrometry

A device, ICPS-8000 manufactured by Shimadzu Corp. was used. First, by qualitative analysis, elements dissolved in the analyzing liquid were checked. Next, the detected elements were subjected to quantitative analysis by a calibration curve method. The analysis wavelength of each of the elements which was used in the quantitative analysis was appropriately selected, considering the spectral interference based on the element of the analyzing liquid, the intensity thereof, the profile thereof and others.

High frequency power: 1.2 kW
Torch measurement height: 11 mm
Coolant gas flow rate: 14.0 L/min.
Plasma gas flow rate: 1.20 L/min.
Carrier gas flow rate: 0.70 L/min.
IC (Ion Chromatography) Analysis
A device, DX500 manufactured by Dionex Co. was used.
Column: IonPac AS15
Elute: 20-40 mmol/L KOH gradient
Flow rate: 1.2 mL/min.
Introduced amount: 25 μL
Detector: Suppressor type electric conductivity Results from the ICP emission spectroscopy are shown in Table 2, and results from the IC analysis are shown in Table 3.

From the amount of $PO_4^{3-}$ and the amount of $Mg^{2+}$ of each of the tape samples of ½ inch width and 1 m length, the amount of $PO_4^{3-}$ and the amount of $Mg^{2+}$ per 10 mm$^3$ of the volume of the lower non-magnetic layer of tape sample were obtained by conversion. An example of the conversion is described below.

Since the width of the tape sample was ½ inch, that is, 12.65 mm and the thickness of the lower non-magnetic layer was 2.0 μm, the volume of the lower non-magnetic layer of the tape sample of 1 m length was (1000 mm×12.65 mm×2.0 μm)=25.3 mm$^3$.

Accordingly, the amount of $PO_4^{3-}$ per 10 mm$^3$ of the volume of the lower non-magnetic layer of the tape sample of Example 1 was (57 μg×10 mm$^3$/25.3 mm$^3$)=22.5 μg and the amount of $Mg^{2+}$ per 10 mm$^3$ thereof was (55 μg×10 mm$^3$/25.3 mm$^3$)=21.7 μg.

The amount of $PO_4^{3-}$ and the amount of $Mg^{2+}$ per 10 mm$^3$ of the volume of the lower non-magnetic layer of each of the tape samples are shown in Table 4.

As can be understood from Tables 2, 3 and 4, no $PO_4^{3-}$ was detected from the tape sample of Comparative Example 1. This fact demonstrates that the phosphoric acid ester, RE610 used as the dispersant in the non-magnetic layer and the magnetic layer is not detected as $PO_4^{3-}$ by the present extraction method with water.

Separately, the magnetic layer and the lower non-magnetic layer of each of the tape samples were taken off with an organic solvent, and then the tape sample having neither magnetic layer nor lower non-magnetic layer was subjected to the same extraction treatment with water as described above, and then subjected to ICP emission spectrometry and IC analysis. As a result, neither $PO_4^{3-}$ nor $Mg^{2+}$ was detected.

From the above-mentioned fact, the results shown in Tables 2, 3 and 4 show the amount of $PO_4^{3-}$ and the amount of $Mg^{2+}$ from the lower non-magnetic layer of each of the tape samples.

Each of the tape samples of Examples 1 and 2 satisfying the requirements of the present invention was excellent in the surface smoothness of its magnetic layer and friction durability, gave only a small error rate thereof, and caused no seepage of the lubricant(s). Thus, each of the samples had excellent tape properties.

The addition of the phosphoric acid compound or the magnesium compound was performed by a method of adhering to the iron oxide surface. As a result, the same advantageous effects as described above were obtained.

TABLE 2

ICP analysis results: tape samples of ½ inch width and 1 m length

| Detected elements | Example 1 | Example 2 | Comparative Example 1 |
|---|---|---|---|
| Na (μg) | 8.1 | 8.0 | 10 |
| Mg (μg) | 55 | 22 | 3.0 |
| Al (μg) | 0 | 0 | 1.4 |
| Si (μg) | 0 | 0 | 1.2 |
| P (μg) | 4.4 | 27 | 0 |
| Ca (μg) | 0.62 | 0.7 | 5.9 |
| Mn (μg) | 7.9 | 11 | 7.9 |
| Fe (μg) | 3.7 | 21 | 17 |
| Co (μg) | 3.3 | 6.1 | 1.9 |
| Sr (μg) | 0.24 | 0.24 | 0.27 |
| Y (μg) | 1.2 | 1.7 | 12 |
| Ba (μg) | 24 | 23 | 30 |

TABLE 3

IC analysis results: tape samples of ½ inch width and 1 m length

| Detected ions | Example 1 | Example 2 | Comparative Example 1 |
|---|---|---|---|
| Cl$^-$ (μg) | 15 | 14 | 13 |
| NO$_2^-$ (μg) | 2.7 | 0 | 3 |
| SO$_4^{2-}$ (μg) | 31 | 28 | 26 |
| NO$^{3-}$ (μg) | 5.6 | 5.5 | 7.2 |
| PO$_4^{3-}$ (μg) | 57 | 20 | 0 |

TABLE 4

Amount per 10 mm³ of volume of lower non-magnetic layer, converted from IC analysis and ICP analysis

| | Example 1 | Example 2 | Comparative Example 1 |
|---|---|---|---|
| PO$_4^{3-}$ (μg) | 22.5 | 7.9 | 0 |
| Mg (μg) | 21.7 | 8.7 | 1.2 |

What is claimed is:

1. A magnetic recording medium comprising:
   a non-magnetic support,
   a lower non-magnetic layer comprising at least a non-magnetic powder and a binder resin on one surface of the non-magnetic support, and
   a magnetic layer comprising at least a ferromagnetic powder and a binder resin on the lower non-magnetic layer, wherein
   wherein when the magnetic recording medium is subjected to an extraction treatment with water, 7 to 23 μg of $PO_4^{3-}$ ions are extracted, and 8 to 22 μg of $Mg^{2+}$ ions are extracted into the water, per 10 mm³ of the volume of the lower non-magnetic layer of the magnetic recording medium; and
   wherein the ferromagnetic powder is a planar hexagonal powder having a coercive force ranging from 79 to 237 kA/m, a saturation magnetization of 50 to 70 Am²/kg, an average planar particle size of 30 to 80 and a plate ratio of 3 to 7.

2. The magnetic recording medium according to claim 1, wherein the lower non-magnetic layer comprises an acicular iron oxide powder as the non-magnetic powder.

3. The magnetic recording medium according to claim 2, wherein the specific surface area of the acicular iron oxide powder as measured by the BET method is from 70 to 100 m²/g.

4. The magnetic recording medium according to claim 1, wherein the thickness of the lower non-magnetic layer ranges from 0.3 to 2.5 μm, and the thickness of the upper magnetic layer ranges from 0.03 to 0.30 μm.

5. The magnetic recording medium according to claim 1, wherein the lower non-magnetic layer contains carbon black in an amount ranging from 5 to 30% by weight.

6. The magnetic recording medium according to claim 2, wherein the acicular iron oxide powder has an average long axis length of 0.15 μm or less.

7. The magnetic recording medium according to claim 2, wherein particles of the acicular iron oxide powder have an axial ratio ranging from 2 to 10.

8. The magnetic recording medium according to claim 2, wherein the acicular iron oxide powder is present in the non-magnetic layer in an amount ranging from 40 to 80% by weight.

9. The magnetic recording medium according to claim 1, wherein the lower non-magnetic layer contains binder resin in an amount ranging from 10 to 100 parts by weight per 100 parts by weight of the sum of amounts of carbon black and non-magnetic powdered inorganic materials other than carbon black.

10. The magnetic recording medium according to claim 1, wherein the non-magnetic layer contains a lubricant in an amount ranging from 1 to 20% by weight based on the sum of amounts of carbon black and non-magnetic powdered inorganic materials other than carbon black.

11. The magnetic recording medium according to claim 1, wherein said medium exhibits a coercive force ranging from 94.8 to 173.8 kA/m.

12. The magnetic recording medium according to claim 1, wherein the ferromagnetic powder has a water-soluble sodium ion content of 70 ppm or less by weight and a water-soluble calcium ion content of 30 ppm or less by weight.

13. The magnetic recording medium according to claim 1, wherein the binder resin of the magnetic layer is present in an amount of 5 to 40 parts by weight per 100 parts by weight of ferromagnetic powder.

14. The magnetic recording medium according to claim 1, wherein the magnetic layer contains a particulate abrasive having an average particle size ranging from 0.01 to 0.2 μm that is present in an amount of 3 to 25 parts by weight per 100 parts by weight of the ferromagnetic powder.

* * * * *